United States Patent [19]

Lissant

[11] 3,974,116

[45] Aug. 10, 1976

[54] EMULSION SUSPENSIONS AND PROCESS FOR ADDING SAME TO SYSTEM

[75] Inventor: Kenneth J. Lissant, St. Louis, Mo.

[73] Assignee: Petrolite Corporation, St. Louis, Mo.

[22] Filed: Mar. 20, 1974

[21] Appl. No.: 452,846

[52] U.S. Cl. .......................... 260/29.2 UA; 75/9; 210/42 R; 252/8.5 P; 252/312; 260/29.6 H; 260/29.6 HN; 260/29.6 WQ; 260/33.6 R; 260/33.6 UA
[51] Int. Cl.² ...................... C08J 3/12; C08L 91/00
[58] Field of Search ............... 260/29.6 M, 29.6 H, 260/29.6 NH, 29.6 WQ, 29.6 PM, 29.1 R, 32.4, 32.6 R, 30.8 DS, 30.6 R, 32.8 R, 33.4 R, 29.2 UA; 210/54

[56] References Cited
UNITED STATES PATENTS

| 241,505 | 5/1881 | Du Motuy et al. | 424/161 |
|---|---|---|---|
| 2,742,426 | 4/1956 | Brainerd | 252/8.55 |
| 3,352,109 | 11/1967 | Lissant | 60/205 |
| 3,378,418 | 4/1968 | Lissant | 252/330 |
| 3,396,537 | 8/1968 | Lissant et al. | 44/51 |
| 3,453,207 | 7/1969 | Eck et al. | 210/54 |
| 3,539,406 | 11/1970 | Lissant | 149/18 |
| 3,565,817 | 2/1971 | Lissant | 252/312 |
| 3,617,095 | 11/1971 | Lissant | 252/312 |
| 3,700,594 | 10/1972 | Lissant | 252/8.55 |
| 3,732,166 | 5/1973 | Lissant | 252/8.55 |

FOREIGN PATENTS OR APPLICATIONS 1,227,345 9/1972 United Kingdom

*Primary Examiner*—Joseph L. Schofer
*Assistant Examiner*—Peter F. Kulkosky
*Attorney, Agent, or Firm*—Sidney B. Ring; Hyman F. Glass

[57] ABSTRACT

This invention relates to a non-settling suspension of solid chemical in a high internal phase ratio emulsion, said solid chemical being substantially insoluble in, and non-reactive with, either phase of the emulsion.

This emulsion suspension, which is stable to settling and deterioration, can be added to a system with much greater facility than can be effected by adding the solid alone.

15 Claims, No Drawings

EMULSION SUSPENSIONS AND PROCESS FOR ADDING SAME TO SYSTEM

Many industrial processes employ solid chemicals which must be continually added thereto. These chemicals are difficult to handle in a way that they can be reliably metered into the process stream because of various problems. Often when these chemicals are added to systems containing solvents they tend to be slowly soluble and therefore clump or agglomerate so as to make addition slow or difficult. In certain instances where they are dissolved in a solvent, they produce solutions even at low temperatures which are so viscous they are difficult to meter into the process.

By way of illustration, various synthetic and naturally-occurring water-soluble polymers have been developed which exhibit, in aqueous solution, superior thickening and flocculating properties. These polymers are being used increasingly in a number of commercial applications such as, for example, in the clarification of aqueous solutions, in papermaking operations, in the treatment of sewage and industrial wastes, as stabilizers for drilling muds, and in the secondary recovery of petroleum by waterflooding.

Although these polymers are most often available commercially as powders or as a finely-divided solid, they are most frequently utilized as aqueous solutions. This necessitates that the solid polymer material be dissolved in water. Although the various polymers are more or less soluble in water, difficulty is often experienced in preparing aqueous polymer solutions because of their slow dissolution and because the solid polymer is not readily dispersible in water. Furthermore, dispersion of solid polymers in water is hindered by their tendency to clump or remain as agglomerates on contact with water. Lumps of solid polymer immediately form by the encapsulation of undissolved solids in an outer coating of water-wet polymer which retards the penetration of additional water into the agglomerate. Although many of these lumps are eventually dissolved by continued agitation, it is frequently impractical to agitate the solution for a sufficiently long period to obtain complete dissolution.

These polymers are well-know to the art and have been described in numerous publications and patents. The polymers most commonly used in many industrial applications are acrylamide and its water-soluble copolymeric derivatives such as, for instance, acrylamide-acrylic acid, and acrylamide-acrylic acid salt copolymers which contain from about 95–5% by weight of acrylamide. Also useful are copolymers of acrylamide with other vinyl monomers such as maleic anhydride, acrylonitrile, styrene and the like.

Other water-soluble vinyl polymers are described in detail in the following U.S. Pat. Nos. 3,418,237, 3,259,570 and 3,171,805.

In examining the disclosures of these patents it will be seen that the water-soluble polymers may be either cationic or anionic and, in some instances, the ionic charges are sufficiently slight so that the polymers may be considered as nonionic.

For example, water-soluble polymers and copolymers of allyl, diallyl amines, or dimethylaminoethylmethacrylate are cationic. Polymers such as polyvinyl alcohol are non-ionic, and polymers such as polyacrylic acid or polystyrene sulfonates are anionic. All of these polymers may be used in the practice of the invention.

The molecular weight of the polymers described above may vary over a wide range, e.g. 10,000–25,000,000. The invention, however, finds its greatest usefulness in preparing aqueous solutions or dispersions of these polymers and, in particular, acrylamide polymers whose molecular weights are in excess of 1,000,000. Polymers having higher molecular weights are more difficulty dissolved in water and tend to form extremely viscous solutions at relatively low concentrations. Also, the polymers may be produced by any known methods of conducting polymerization reactions. Thus, solution suspension or emulsion polymerization techniques may be used. The gums are well-known water-soluble polymers and are described in vol. 10 of the Encyclopedia of Chemical Technology, 2nd edition, Interscience Publishers, 1966.

The invention is capable of producing rapidly aqueous solutions of the water-soluble vinyl addition polymers or gums having concentrations within the range of 0.1–20% by weight. The invention most often finds usefulness when it is desired to form aqueous solutions of polymers having a solution concentration of 0.2–2.0% by weight.

I have now discovered a method of avoiding many of these problems which comprises suspending the solid that one wishes to add to the process in a high internal phase ratio emulsion, neither phase of the emulsion being capable of dissolving or swelling the solid. These suspensions of solid materials in an emulsion, being non-Newtonian fluids are stable to settling or deterioration, can be metered with conventional equipment into the reaction. The solid can be added to the emulsion after it has been prepared or can be added to one phase and this phase emulsified with another phase.

In the practice of this invention an emulsion is made of the principal liquid in a small amount of a second immiscible liquid. These emulsions are characterized by having a very low volume percent of external phase, and are highly thixotropic. Although they appear to be elastic solids, having much the consistency of a gelatin gel when at rest, they can however be easily pumped under low pump pressures.

The present invention suspends solid particles by an entirely different mechanism. In the composition of this invention the solid particles may be said to be encapsulated in the individual globules of internal liquid phase. Thus, in order to settle they would have to pass through a multiplicity of interfaces which they cannot do without breaking the emulsion. Therefore, as long as the emulsion is stable the solids remain suspended.

The emulsions of this invention are high internal phase-low external phase emulsions. They may be either oil-in-non-oil and non-oil-in-oil type emulsions, but preferably oil-in-non-oil. The internal phase of the emulsion may be at least 80% by volume, for example at least 85%, preferably at least 90%, but can be at least 95% by volume or greater, the residue of the emulsion comprising the external phase and the emulsifier.

A minor but sufficient amount of emulsifier is added to form the emulsion, for example from 0.05–10% by volume such as from 0.1–5%, but preferably from 0.2–3% of emulsifier, based on the volume of total emulsion.

The emulsion has two phases, one of which is the non-aqueous or oily phase and the other the non-oily phase.

The term "oily phase," as herein employed, is intended to include a vast number of substances, both natural and artificial, possessing widely different physical properties and chemical structures. All of the substances included within this term are practically insoluble in water, possess a characteristic greasy touch and have a low surface tension. These include the animal oils of both land and sea animals; vegetable oils, both drying and non-drying; petroleum or mineral oils of various classes, includng those of open chain hydrocarbons, cyclic hydrocarbons or cycloparaffins, with or without the presence of solid paraffins and asphalts and various complex compounds, and which may or may not contain sulphur or nitrogenous bodies; resin oils and wood distillates including the distillates of turpentine, rosin spirits, pine oil, and acetone oil; various oils, obtained from petroleum products, such as gasolenes, naphthas, gas fuel, lubricating and heavier oils; coal distillate, including benzene, toluene, xylene, solvent naphtha, creosote oil and anthracene oil and ethereal oils.

The choice of oily phase materials is not limited to hydrocarbons since esters such as dibutyl phthalate, diethylmaleate, tricresylphosphate, acrylate or methacrylate esters, natural esters, and the like have been employed by us successfully in the preparation of useful emulsions. Tung oil, oiticica oil, castor oil, linseed oil, poppyseed oil, soyabean oil, animal and vegetable oils such as cottonseed oil, corn oil, fish oils, walnut oils, pineseed oils, olive oil, coconut oil, degras, and the like, may also be used.

The primary consideration is that the "oily" phase must not dissolve, swell or react with the solid suspended polymer particles and it must be immiscible with the other liquid phase.

The non-oily phase may be any relatively polar liquid composition which is immiscible with the oily phase and does not dissolve, swell, or react with the suspended materials.

Particularly preferred are aqueous systems, particularly those whose solubility is adjusted with auxiliary agents such as solutes, inorganic or organic materials, salts, sugars, etc., employed alone or in conjunction with water containing other solvents such as alcohols, glycols, polyols, ketones, etc. Particularly preferred are salts employed with water, or aqueous solvent systems such as aqueous alcohol, aqueous glycol, etc., most preferably those salts which are hydroscopic such as $CaCl_2$, particularly where acrylic-type polymers and copolymers are to be suspended.

The following description of the non-oily, non-aqueous phase which can be employed in preparing emulsions is presented in U.S. Pat. No. 3,539,406. This description may be useful in selecting non-oily phases, with the further provisions that the phase selected does not dissolve, swell or react with the suspended particles.

The non-oily phase employed herein is one which possesses a cohesive energy density number in excess of about 10, whereas hydrocarbons typically possess values of less than about 10.

Cohesive energy density is the quotient of the molar heat of vaporization and the molar volume. The cohesive energy density (C.E.D.) is the amount of energy necessary to separate one ml. of liquid into its molecules. Conversely, the C.E.D. is the energy which holds 1 ml. of liquid together.

The following compounds have a C.E.D. number of about 10 or greater.

The C.E.D. number is defined as $\sqrt{C.E.D.}$ and is usually employed in comparisons and calculations.

The following is a list of compounds having a C.E.D. number of about 10 or greater. In general, there should be sufficient difference in the C.E.D. numbers of each phase to make a suitable emulsion.

| Description | C.E.D. No. |
|---|---|
| N,N-diethyl acetamide | 9.92 |
| 1,4-dioxane | 9.95 |
| Acetone | 10.00 |
| Carbon disulfide | 10.00 |
| Dioxane | 10.00 |
| Ethylamine | 10.00 |
| Nitrobenzene | 10.00 |
| Propionic anhydride | 10.00 |
| Acetic Acid | 10.10 |
| t-Butyl alcohol | 10.10 |
| Methyl formate | 10.10 |
| Polymethyl chloroacrylate | 10.10 |
| m-Cresol | 10.20 |
| Cyclohexanol | 10.20 |
| Methyl formate | 10.20 |
| Methyl iodide | 10.20 |
| Propionitrile | 10.20 |
| Pyridine | 10.20 |
| Acetaldehyde | 10.30 |
| Aniline | 10.30 |
| Carbon disulfide | 10.30 |
| Isobutyric acid | 10.30 |
| Methylene chloride | 10.30 |
| n-Octyl alcohol | 10.30 |
| sec-Butyl alcohol | 10.40 |
| Cyclopentanone | 10.40 |
| 1,2-dibromomethane | 10.40 |
| Methyl formate | 10.40 |
| Acrylonitrile | 10.50 |
| Bromoform | 10.50 |
| n-Butyric acid | 10.50 |
| Tris (dimethylamido)phosphate | 10.50 |
| Isobutyl alcohol | 10.50 |
| Cellulose dinitrate | 10.56 |
| Acetic anhydride | 10.60 |
| tert-Butyl alcohol | 10.60 |
| N,N-diethylformamide | 10.60 |
| n-Heptyl alcohol | 10.60 |
| Propionitrile | 10.60 |
| n-Butyl alcohol | 10.70 |
| n-Hexyl alcohol | 10.70 |
| Polyglycol terephthalate | 10.70 |
| Polymethacrylonitrile | 10.70 |
| Pyridine | 10.70 |
| Benzyl alcohol | 10.80 |
| N,N-dimethylacetamide | 10.80 |
| Amyl alcohol | 10.90 |
| Cellulose diacetate | 10.90 |
| N-acetylpiperidine | 11.00 |
| Dichloroacetic acid | 11.00 |
| Ethyl cyanoacetate | 11.00 |
| Di-methyl malonate | 11.00 |
| Cyclobutanedione | 11.10 |
| Dimethyl oxalate | 11.10 |
| Ethyl oxide | 11.10 |
| Furfural | 11.20 |
| Methyl amine | 11.20 |
| Dipropyl sulphone | 11.30 |
| N-acetylpyrrolidine | 11.40 |
| n-Butanol | 11.40 |
| NNN′N′-tetramethyloxamide | 11.40 |
| Bromine | 11.50 |
| N-formylpiperidine | 11.50 |
| Isopropanol | 11.50 |
| N-acetylmorpholine | 11.60 |
| Acetonitrile | 11.70 |
| Allyl alcohol | 11.80 |
| Methylene iodide | 11.80 |
| Acetonitrile | 11.90 |
| N-propyl alcohol | 11.90 |
| 2:3-butylene carbonate | 12.00 |
| Acetonitrile | 12.10 |
| Dimethyl formamide | 12.10 |
| Dimethyltetramethylene sulphone | 12.10 |
| Formic acid | 12.10 |
| Hydrogen cyanide | 12.10 |
| Ethylene chlorhydrin | 12.20 |
| Methylene glycollate | 12.40 |
| Nitromethane | 12.40 |
| Diethyl sulphone | 12.50 |
| Dimetyl phosphite | 12.50 |
| Methyl propyl sulphone | 12.50 |
| Chloroacetonitrile | 12.60 |

-continued

| Description | C.E.D. No. |
| --- | --- |
| Osmium tetroxide | 12.60 |
| α-Caprolactam | 12.70 |
| Ethyl alcohol | 12.70 |
| Nitro methane | 12.70 |
| β-Methyltetramethylene sulphone | 12.90 |
| N-formylmorpholine | 13.00 |
| N,N-dimethylnitroamine | 13.10 |
| Butyrolactone | 13.30 |
| Propiolactone | 13.30 |
| 1:2-propylene carbonate | 13.30 |
| Methyl ethyl sulphone | 13.40 |
| γ-Pyrone | 13.40 |
| Maleic anhydride | 13.60 |
| γ-Piperidone | 13.60 |
| Dimethyl sulfoxide | 13.90 |
| Methyl alcohol | 14.30 |
| Tetramethylene sulphone | 14.30 |
| EtOH | 14.40 |
| Methanol | 14.40 |
| Dimethyl sulphone | 14.60 |
| Ethylene glycol | 14.60 |
| Ethylene carbonate | 14.70 |
| γ-Pyrrolidone | 14.70 |
| Polyacrylonitrile | 14.80 – 15.20 |
| Malonylnitrile | 15.10 |
| Succinic anhydride | 15.40 |
| Ammmonia | 16.30 |
| Water | 24.20 |

In general, in addition, the non-oily phase possesses the following characteristics:

1. Is liquid over the range of use.
2. Is essentially immiscible with the other liquid phase and/or is capable of forming a distinct separate phase.
3. If used as the external phase is capable of dissolving the emulsifier so as to concentrate it at the liquid interfaces to prevent coalescence of the internal phase.
4. Is itself a solvating agent, or contains a solvating agent or mixture of solvating agents, for the emulsifier.

Thus, the non-oily phase contains one or more non-oily materials and an emulsifier dissolved therein, said non-oily phase being essentially insoluble in the oily phase and said emulsifier being capable of preparing and maintaining a stable, viscous, thixotropic or pseudoplastic emulsion.

Stated another way, the non-oily phase may be looked upon as having two functions:

1. Is essentially immiscible in the oily phase and/or is capable of forming a distinct separate phase.
2. When used as the external phase is itself a solvent for the emulsifier, or containing a solvent capable of dissolving the emulsifier so as to concentrate the emulsifier at the interface to prevent coalescence of the internal phase.

The non-oily phase if not aqueous may be of (1) the polar protic type as illustrated by: Alcohols, e.g., methanol, ethanol, propanol, etc. Glycols, e.g., ethylene glycol, propylene glycol, etc. Polyglycols, e.g., $H(OA)_nH$ where A is alkylene and $n$ is an integer, for example 1–10 or greater, for example diethyleneglycol, triethyleneglycol, dipropyleneglycol, tripropyleneglycol, etc., polyalcohols, aldehydes, polyaldehydes, etc.; and (2) of the polar aprotic type as illustrated by N-alkylcarboxylamides such as N,N-dialkylcarboxylamides such as N,N-dimethylformamide, N,N-dimethyl acetamide, N,N-diethylformamide, N,N-diethylacetamide, etc., and closely related compounds such as formamide, N-methyl formamide, N,N-dimethyl methoxy acetamide, etc.

Other illustrative solvents are dimethyl sulfoxide, dimethyl sulfone, N-methyl-2-pyrrolidone, tetramethylurea, pyridine, hexamethyl phosphoramide, tetramethylene sulfone, butyrolactone, nitroalkanes such as nitromethanes, nitroethanes, etc.

Mixtures of a variety of polar aprotic solvents can also be employed, as well as polar aprotic solvents in combination with polar protic solvents.

The emulsions of the present invention possess the following advantages:

1. *Nonadhesive.* — They tend not to stick to the sides of the container. Thus "hold up" in tanks is minimized.
2. *Viscosity.* — The apparent rest viscosity is greater than 1000 cps., generally in the range of 10,000–100,000 or greater. However, under low shear, they will flow with a viscosity approaching that of the liquid phases. On removal of shear, the recovery to original apparent rest viscosity is nearly instantaneous. The hysteresis loop is very small.
3. *Temperature Stability.* — Increased temperature has little effect on viscosity until the critical stability temperature is reached at which point emulsions break into their liquid components. This permits a wide temperature range of operation.
4. *Pumpable.* — Although behaving like a semi-solid at rest, the compositions may be pumped easily by any equipment capable of dealing with liquids containing particulate matter.
5. *Quality Control.* — With these emulsions it is easy to reproduce batches with identical properties due to the absence of any "gel" structure.
6. Solid loading. — Emulsions will flow well even with high solids loading since they have a broad range between rest viscosity and viscosity under modest shear.

In contrast to very high volume percent solid loading in gels or slurries which result in a "putty," these emulsions can suspend such solids in the internal phase while allowing the external phase to govern "flowability."

Any suitable emulsifier can be employed. The emulsifiers most usually employed in the practice of this invention are generally known as oxyalkylated surfactants or more specifically polyalkylene ether or polyoxyalkylene surfactants. Oxyalkylated surfactants as a class are well known. The possible sub-classes and specific species are legion. The methods employed for the preparation of such oxyalkylated surfactants are also too well known to require much elaboration. Most of these surfactants contain, in at least one place in the molecule and often in several places, an alkanol or a polyglycolether chain. These are most commonly derived by reacting a starting molecule, possessing one or more oxyalkylatable reactive groups, with an alkylene oxide such as ethylene oxide, propylene oxide, butylene oxide, or higher oxides, epichlorohydrin, etc. However, they may be obtained by other methods such as shown in U.S. Pat. Nos. 2,588,771 and 2,596,091-3, or by esterification or amidification with an oxyalkylated material, etc. Mixtures of oxides may be used as well as successive additions of the same or different oxides may be employed. Any oxyalkylatable material may be employed. As typical starting materials may be mentioned alkyl phenols, phenolic resins, alcohols, glycols, amines, organic acids, carbohydrates, mercaptans, and partial esters of polybasic acids. In general, the art teaches that, if the starting material is water-soluble, it may be converted into an oil-soluble surfactant by the addition of polypropoxy or polybutoxy chains. If the starting material is oil-soluble, it may be converted into a water-soluble surfactant by the addition of polyethoxy chains. Subsequent additions of ethoxy units to the chains tend to increase the water solubility, while, subsequent additions of high alkoxy chains tend to increase the oil solubility. In general, the final solubility and surfactant properties are a result of a balance between the oil-soluble and water-soluble portions of the molecule.

In the practice of this invention it has been found that emulsifiers suitable for the preparation of high internal phase ratio emulsions may be prepared from a wide variety of starting materials. For instance, if one begins with an oil-soluble material such as a phenol or a long chain fatty alcohol and prepare a series of products by reaction with successive portions of ethylene oxide, one finds that the members of the series are successively more water-soluble. One finds also that somewhere in the series there will be a limited range where the products are useful for the practice of this invention. Similarly it is possible to start with water or a water-soluble material such as polyethylene glycol and add, successively, portions of propylene oxide. The members of this series will be progressively less water-soluble and more oil-soluble. Again there will be a limited range where the materials are useful for the practice of this invention.

In general, the compounds which would be selected for testing as to their suitability are oxyalkylated surfactants of the general formula Z [(OR)$_n$OH]$_m$ wherein Z is the oxyalkylatable material, R is the radical derived from the alkylene oxide which can be, for example, ethylene, propylene, butylene, epichlorohydrin and the like, $n$ is a number determined by the moles of alkylene oxide reacted, for example 1 to 2000 or more and $m$ is a whole number determined by the number of reactive oxyalkylatable groups. Where only one group is oxyalkylatable as in the case of a monofunctional phenol or alcohol R'OH, then $m = 1$. Where Z is water, or a glycol, $m = 2$. Where Z is glycerol, $m = 3$, etc.

In certain cases, it is advantageous to react alkylene oxides with the oxyalkylatable material in a random fashion so as to form a random copolymer on the oxalkylene chain, i.e. the [(OR)$_n$OH]$_m$ chain such as

—AABAAABBABABBABBA—

In addition, the alkylene oxides can be reacted in an alternate fashion to form block copolymers on the chain, for example —BBBAAABBBAAAABBBB—  or  —BBBBAAACCCAAAABBBB— where A is the unit derived from one alkylene oxide, for example ethylene oxide, and B is the unit derived from a second alkylene oxide, for example propylene oxide, and C is the unit derived from a third alkylene oxide, for example, butylene oxide, etc. Thus, these compounds include terpolymers or higher copolymers polymerized randomly or in a block-wise fashion or many variations of sequential additions.

Thus, (OR)$_n$ in the above formula can be written —A$_a$B$_b$C$_c$— or any variation thereof, wherein $a$, $b$, and $c$ are 0 or a number provided that at least one of them is greater than 0.

It cannot be overemphasized that the nature of the oxyalkylatable starting material used in the preparation of the emulsifier is not critical. Any species of such material can be employed. By proper additions of alkylene oxides, this starting material can be rendered suitable as an emulsifier and its suitablility can be evaluated by plotting the oxyalkyl content of said surfactant versus its performance, based on the ratio of the oil to water which can be satisfactorily incorporated into water as a stable emulsion. By means of such a testing system any oxyalkylated material can be evaluated and its proper oxyalkylation content determined.

As is quite evident, new oxyalkylated materials will be constantly developed which could be useful in our compositions. It is therefore not only impossible to attempt a comprehensive catalogue of such compositions, but to attempt to describe the invention in its broader aspects in terms of specific chemical names of its components used would be too voluminous and unnecessary since one skilled in the art could be following the testing procedures described herein select the proper agent. This invention lies in the use of suitable oxyalkylated emulsifiers in preparing the compositions of this invention and their individual composition is important only in the sense that their properties can effect these emulsions. To precisely define each specific oxyalkylated surfactant useful as an emulsifier in light of the present disclosure would merely call for chemical knowledge within the skill of the art in a manner analogous to a mechanical engineer who prescribes in the construction of a machine the proper materials and the proper dimensions thereof. From the description in this specification and with the knowledge of a chemist, one will know or deduct with confidence the applicability of oxyalkylated emulsifiers suitable for this invention by means of the evaluation tests set forth herein. In analogy to the case of a machine wherein the use of certain materials of construction or dimensions of parts would lead to no practical useful result, various materials will be rejected as inapplicable where others would be operative. One can obviously assume that no one will wish to make a useless composition or will be misled because it is possible to misapply the teachings of the present disclosure in order to do so. Thus, any oxyalkylated surfactant that can perform the function stated herein can be employed.

| No. | REPRESENTATIVE EXAMPLES OF Z |
| --- | --- |
| 1 | $RC(=O)-O-$ |
| 2 |  |
| 3 | $R-O-$ |
| 4 | $R-S-$ |
| 5 | $R-C(=O)-N(H)-$ |
| 6 | $R-C(=O)-N\begin{smallmatrix}/\\ \backslash\end{smallmatrix}$ |
| 7 | $R-N(H)-$ |

-continued

REPRESENTATIVE EXAMPLES OF Z

| No. | Z |
|---|---|
| 8 | RN< |
| 9 | Phenol-aldehyde resins. |
| 10 | —O— (Ex.: Alkylene oxide block polymers.) |
| 11 | 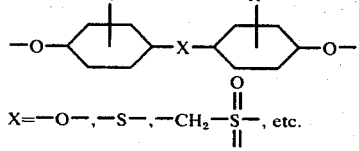 X=—O—,—S—,—CH₂—S—, etc. |
| 12 | R—S—CH₂C(=O)—O— |
| 13 | RPO₄H— |
| 14 | RPO₄< |
| 15 | PO₄≡ |
| 16 | 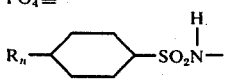 |
| 17 | 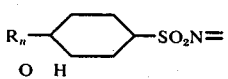 |
| 18 | 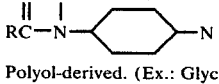 |
| 19 | Polyol-derived. (Ex.: Glycerol, glucose, pentaerythritol.) |
| 20 | Anhydrohexitan or anhydrohexide derived. (Spans and Tweens.) |
| 21 | Polycarboxylic derived. |
| 22 | —CHCH₂—O<sub>n</sub><br>    \|<br>   CH₂<br>    \|<br>  amine |

The amount of solid chemical present as a suspension in the emulsion in either phase or the total emulsion can vary widely, from about 1 to 60% or more by weight of chemical to volume of emulsion, such as from about 5 to 50%, for example from about 10 to 40%, but preferably from about 15 to 35%. Of course the particular percent will depend on the particular chemical and the particular system.

The following examples are presented for purposes of illustration and not of limitation.

EXAMPLE 1

100 grams of calcium chloride dihydrate, 60 grams of water and 40 grams of denatured ethanol were mixed until all the solids were dissolved. This was designated solution A.

16 milliliters of kerosene and 4 milliliters of emulsifier made by reacting one part of dinonylphenol with 0.7 parts of ethylene oxide were mixed in a tall form beaker using a split-disc stirrer. 50 milliliters of solution A were added while stirring. A translucent water-in-oil emulsion resulted. 41 grams of a solid granular acrylic acid polymer were added slowly while stirring. The result was a thick suspension.

EXAMPLE 2

A solution was made by mixing 210 grams of calcium chloride dihydrate, 120 grams of water and 100 grams of denatured ethanol. This was called solution B.

8 milliliters of kerosene and 2 milliliters of emulsifier made according to the process of examples 1 through 8 of U.S. Pat. No. 3,352,109 except that a commercial grade 8 to 10 carbon alcohol was used and 2.50 wts. of propylene oxide and 1.49 wts. of ethylene oxide added, were mixed as in Example 1 above, and a mixture of 60 milliliters of solution B and 30 grams of a solid granular polymer acrylic acid added. The result was a stable suspension of the polymer in a water-in-oil emulsion.

EXAMPLE 3

13 parts of calcium chloride dihydrate, 7.5 parts of water and 6.2 parts of denatured ethanol were mixed in a tank and 2.5 parts of a material equivalent to example 12 of U.S. Pat. No. 3,352,109 except that nonyl phenol was used, i.e., nonyl phenol + 1.2 pt. wgt. EtO, were added and mixed thoroughly. In a separate tank, 35.2 parts of kerosene and 32.6 parts of a solid powdered high molecular weight acrylic polymer were mixed.

The kerosene-polymer slurry was added slowly with continuous agitation to the aqueous emulsifier solution. The product was a stable, pumpable oil-in-water high internal phase ratio emulsion in which the polymer was suspended.

EXAMPLE 4

Essentially the same procedure was followed as Example 3 above except that the solid powdered polymer was a copolymer of acrylic acid and acrylamide.

EXAMPLE 5

14.31 parts of calcium chloride dihydrate, 13.69 parts of water and 6 parts of the material of Example 12 of U.S. Pat. No. 3,352,109, except that nonyl phenol was used, i.e., nonyl phenol + 1.2 pt. wgt. EtO, were added and mixed thoroughly. In a separate tank 35.2 parts of kerosene and 32.6 parts of solid powdered high molecular weight acrylic polymer (Cyfloc 326) were mixed. The kerosene-polymer slurry was added slowly with continuous agitation to the aqueous emulsifier solution. The product was a stable, pumpable, oil-in-water high internal phase ratio emulsion in which the polymer was suspended.

These improved polymer suspensions in a high internal phase ratio emulsion can be added to systems to which the polymer is usually added as a solid such as in the treatment of sewage and industrial wastes, in stabilizing drilling muds, in the secondary recovery of petroleum by water flooding.

Not only may this invention be used as a means of adding water-soluble polymers to aqueous systems but it may also be used to add oil-soluble polymers to non-aqueous systems. For instance, oil-soluble polymers such as (poly) butadiene, (poly) vinyl butryal, (poly) vinyl chloride, etc. can be suspended in an emulsion of either the oil-in-water or water-in-oil type and dispersed into oily media such as paint vehicles.

WATER CLARIFICATION

The present invention also relates to a method for the clarification of water containing suspended matter.

Accordingly clarification of water containing suspended particles of matter is effected by adding polymer emulsions of this invention.

Water containing suspended particles which may be treated by the present invention may have its origin either in natural or artificial sources, including industrial and sanitary sources. Waters containing suspended particles of natural origin are usually surface waters, wherein the particles are suspended soil particles (silt), although sub-surface waters may also be treated according to the present invention. Water having its origin in industrial process (including sanitary water) operations may contain many different varieties of suspended particles. These particles are generally the result of the particular industrial or sanitary operation concerned. Prior to discharging such industrial waste waters into natural water courses it generally is desired that the suspended matter be removed.

The present process may likewise be applied to water contained in stock or fish ponds, lakes or other natural or artificial bodies of water containing suspended solids. It may be applied to industrial water supplied either in preparation therefor, during or after use and prior to disposal. It may be applied to sanitary water supplies either for the elimination of suspended solids prior to use for such purposes, or it may be applied to such waters which have become contaminated with impurities from any source.

Most naturally occurring waters contain an amount of simple electrolytes (sodium, potassium, ammonium, calcium, aluminum salts, etc.) in excess of that necessary for the initial aggregation of the ultimate silt particles. This is likewise true of particles of suspended material in industrial or sanitary waters. The ultimate particles of silt or other materials are therefore naturally somewhat aggregated by reason of the presence of such electrolytes. However, the forces binding such ultimate particles together are not great and moreover are not such as to generally effect either rapid settling rates of the flocculated material or strong enough to prevent deflocculation.

The polymer emulsions of this invention cause rapid flocculation and also reinforce the formed aggregates of particles causing a general tightening or bonding together of the initial particles and an increased rate of coagulation and settling, thus forming a less turbid supernatant liquid.

The addition of the polymer emulsions of this invention to the water suspension should be made in such a fashion that the resulting flocculation and aggregation of the particles takes place uniformly throughout the body of water. In order to obtain a uniform addition of the compositions of the invention to the water-borne suspension it is generally desirable to prepare a relatively dilute stock solution of the polymer compositions and then to add such solutions to the body of water in the proportions indicated above. Clarification may take place either in the natural body of water or it may be caused to take place in hydraulic thickeners of known design.

The amount of polymer emulsions to be employed will vary depending upon the amount and the degree of subdivision of the solids to be agglomerated or flocculated, the chemical nature of such solid and the particular polymer emulsion employed. In general, one employs at least a sufficient amount of the polymer emulsion to promote flocculation. In general, one employes 0.005–10,000 p.p.m. of active polymer or more, such as about 0.5–1,000 p.p.m., for example about 1–500 p.p.m., but preferably about 2–5 p.p.m. Since the economics of these processes are important, no more than the minimum amount required for efficient removal is generally employed. It is desired, of course, to employ sufficient polymer so flocculation will take place without causing the formation of stable dispersions. The above p.p.m. relates to the polymer itself in the emulsion.

The precipitating action of the polymer can be employed in the application of loading or filling materials to textiles or paper.

In the processing of fine mineral particles in aqueous suspension the polymer emulsion flocculating agents will be especially useful. In the processing of ores to separate valuable mineral constituents from undesirable matrix constituents, it is frequent practice to grind the ore into a finely-divided state to facilitate separation steps such as selective flotation and the like. In many ore dressing procedures, the finely-divided ore is suspended in water to form a pulp or slime. After processing, it is usually desirable to dewater the pulps or slimes either by sedimentation or filtering. In such operations, certain ores are particularly troublesome in that the finely-divided ore, when suspended in water, forms stable slime which settles very slowly, if at all. Such slimes are unsuitable for concentration or dewatering by sedimentation and are difficult to dewater by filtration because of the tendency to clog the pores of the filter, thus leading to excessively time-consuming and inefficient operation of the filters. In some cases, for example, in certain phosphate mining operations, the formation of very stable suspensions of finely-divided mineral results not only in the loss of considerable valuable minerals as waste but also requires large expenditures for the maintenance of holding ponds for the waste. Similar problems are involved in processing gold, copper, nickel, lead, zinc, iron, such as taconite ores, uranium and other ores, and the inventive flocculating agents will be useful in these operations.

Some specific additional applications for the polymer emulsions of this invention, not intended to be limiting but merely illustrative are listed below. The polymer emulsions can be used for the clarification of beers or wines during manufacture. Another use is in processing effluents in pharamaceutical operations for the recovery of valuable products or removal of undesirable by-products. A particularly important use for these polymer emulsion flocculating agents is in the clarification of both beet sugar and cane sugar juices in their processing. Still another use is for flocculation and recovery of pigments from aqueous suspensions thereof. The polymer emulsions will be particularly useful in sewage treatment operations as a flocculating agent. A further use is to promote by flocculation the removal of coal from aqueous suspensions thereof. In other words, the polymer emulsion flocculating agents of the invention are generally useful for processing aqueous effluents of all types to facilitate the removal of suspended solids.

A water soluble or water dispersible polymer, to the extent of effective concentrations, is employed.

These compositions can also be employed in the process of flocculating white water/or recycling of the precipitate solids in the paper making process of U.S. Pat. No. 3,393,157, and other processes described therein.

Naturally occurring water from many sources, and in some instances, brine and brackish waters are used in the recovery of petroleum by secondary water-flooding operations. Clarification of the water is necessary in many instances prior to water flooding because the suspended impurities tend to plug the underground formations into which waters are pumped.

These polymer emulsions are also effective in flocculating the other systems described herein.

The following is a partial list of industry systems in which the polymer emulsions of the present invention can be employed as flocculating agents.

1. Petroleum industry.
2. Food industry such as in the dairy industry, the canning, freezing and dehydration industries
3. Metal plating industry
4. Chemical and pharmaceutical industries
5. Mining industry, for example, in the phosphate mining industry such as in phosphate slimes
6. Fermentation industries, such as in alcohol, beer, yeast, antibiotics, etc. production
7. Tanning industry
8. Meat packing and slaughter house industry
9. Textile industry
10. Sugar refining industry
11. Coal industry
12. Soap industry
13. Sewage purification
14. Corn starch industry
15. Fat processing and soap industry
16. Paper industry
17. Hydroelectric plants, atomic energy operations, boiler plants, etc.

The following are some non-limiting uses for the polymer emulsions of this invention.

Boiler water additive to prevent sludging
Washing fruits and vegetables
Clarification of beet and cane sugar juice
Film former
Adhesive Additive
Coagulant aid for potable water
Separation of gypsum from wet phosphoric acid
Settling of slimes in aluminum sulfate production
Settling of fines and slimes in coal washing
Additive in wet process cement manufacture
Settling of clay in Borax production
Additive for drainage improvement in asbestos-cement products
Retention aid in the production of paper, paperboard, insulation board, gypsum board and other wet formed mat products
Additive in electrorefining to increase current efficiencies
Additive for use in the flotation of inorganic solids, ores, sulfur, and lime as examples
Clarification additive for use in magnesia production
Clarification of flue dust scrubber effluent in metals production
Additive for use in the flotation of oily wastes
Clarification of recycled drilling water
Additive to improve clarification in hot and cold process lime softening
Dry strength additive in paper and paperboard
Additive to improve efficiency in flotation save alls in the manufacture of paper and paperboard
Friction reducing agent
White liquor clarification in pulp mills
Green liquor clarification in pulp mills
White water clarification in paper mills
Use as a thickening agent in flotation concentrates in ore flotation units, thickeners, and filters
Tailings concentration in mineral and coal and oil shale production
Viscosity improver in aqueous solutions
Use as a hydraulic fluid concentrate
As a waste water conditioner prior to vacuum filtration or centrifugation
Clarification of primary and secondary effluent streams
Concentration of activated sludge by air flotation or gravity thickening
Clarification of latex waste streams
Demulsification of dispersed and emulsified oils, greases, and other hydrophobes The following examples are illustrative.

EXAMPLE A

The high internal phase ratio emulsion of this invention was used to clarify blast scrubber dust and compared to the corresponding solid polymer employed per se, i.e. in non-emulsion form. Based on active polymer employed, the emulsion of Example 5 was effective at 0.05 ppm as compared to the corresponding polymer which had the corresponding effectiveness at 0.2 to 0.4 ppm, an effectiveness factor of 4–8. The high internal phase ratio emulsion was 4–8 times as effective as the corresponding amount of polymer employed per se.

EXAMPLE B

The emulsion of Example 5 was employed as a flocculant aid in an oil refinery. Based on active polymer it was as effective at 0.05 ppm. The corresponding solid polymer per se was effective at 0.1 to 0.2 ppm, thus the emulsion was 2–4 times as effective as the polymer per se.

EXAMPLE C

The terminal treatment effluent of a steel mill was treated with $FeCl_3$ and $Ca(OH)_2$ and a polymer for flocculation and solids removal. Based on active polymer, the emulsion of Ex. 5 was equal or better than treatment with an equal amount of the solid polymer itself.

EXAMPLE D

At a waste treatment plant the waste sludge is processed by means of a centrifuge. In order to produce the desired discharge water quality, a high molecular weight polymer is employed.

The following test was run and based on active polymer, the following results were obtained.

To a 250 ml sample of sludge is added the flocculant of choice diluted in 30 ml. of water. The sample is manually stirred 20 times. The sludge mass is then poured over a modified buchner funnel and the first 30 ml of filtrate is then collected. The filtrate is then processed to determine % non-volatile solids at 105°C.

The results are as follows:

CONTROL 12.21% solids

| ppm | Emulsion Ex. 5 | Corresponding Solid Polymer |
|---|---|---|
| 30 | 3.06 | 6.12 |
| 40 | 0.40 | 6.44 |
| 50 | 0.43 | 4.48 |
| 75 | 1.96 | 6.06 |

Thus, based on active material, the high internal phase ratio emulsion was more effective by a factor of 2–15.

I claim:

1. A stable suspension of a solid particulate soluble polymer in a high internal phase ratio emulsion, said emulsion containing an emulsifying agent, a liquid oil and liquid non-oily phase, neither of which as present in the emulsion substantially dissolve, swell or react with the particulate polymer normally soluble in at least one of the phases, said non-oily phase having a cohesive energy density number in excess of about 10.

2. The composition of claim 1 where the non-oily phase contains an aqueous solution of a hygroscopic salt.

3. The composition of claim 2 where the hygroscopic salt is calcium chloride.

4. The composition of claim 1 where the polymer is a water soluble polymer.

5. The composition of claim 2 where the polymer is a water soluble polymer.

6. The composition of claim 3 where the polymer is a water soluble polymer.

7. The composition of claim 5 where the polymer is a water soluble cationic or anionic polymer.

8. The composition of claim 5 where the polymer is non-ionic.

9. The composition of claim 5 where the polymer is an acrylamide polymer or copolymer.

10. The composition of claim 7 where the polymer is an acrylic acid polymer or copolymer.

11. The composition of claim 5 where the polymer is a water soluble vinyl addition polymer.

12. The composition of claim 1 where the polymer is an oil soluble polymer.

13. The composition of claim 1 where the polymer is an oil soluble polymer.

14. The composition of claim 2 where the polymer is an oil soluble polymer.

15. The composition of claim 3 where the polymer is an oil soluble polymer.

* * * * *